United States Patent
Bungert et al.

(10) Patent No.: US 12,450,663 B2
(45) Date of Patent: Oct. 21, 2025

(54) TRUST PLATFORM

(71) Applicant: METROPOLITAN LIFE INSURANCE CO., New York, NY (US)

(72) Inventors: John Bungert, Durham, NC (US); Terrance Luciani, Monroe Township, NJ (US); Andrew O'Mara, New York, NY (US); Jordan Ashleigh McAlister, Cary, NC (US); Shaun Michael Walter, Cary, NC (US)

(73) Assignee: METROPOLITAN LIFE INSURANCE CO., New York, NY (US)

( * ) Notice: Subject to any disclaimer, the term of this patent is extended or adjusted under 35 U.S.C. 154(b) by 18 days.

(21) Appl. No.: 17/818,586

(22) Filed: Aug. 9, 2022

(65) Prior Publication Data
US 2022/0383316 A1    Dec. 1, 2022

Related U.S. Application Data

(63) Continuation of application No. 17/030,027, filed on Sep. 23, 2020, now Pat. No. 11,443,386.
(Continued)

(51) Int. Cl.
*G06Q 40/08*    (2012.01)
*G06F 21/57*    (2013.01)
(Continued)

(52) U.S. Cl.
CPC ............. *G06Q 40/08* (2013.01); *G06F 21/57* (2013.01); *G06Q 20/02* (2013.01); *G06Q 40/03* (2023.01);
(Continued)

(58) Field of Classification Search
CPC ...................................................... G06Q 40/08
See application file for complete search history.

(56) References Cited

U.S. PATENT DOCUMENTS 7,822,631 B1 * 10/2010 Vander Mey .... G06Q 10/06395
705/7.41
8,700,487 B2 *  4/2014 Grass ................. G06Q 30/0609
705/26.1
(Continued)

OTHER PUBLICATIONS

Trustworthiness evaluation system in E-Commerce context, IEEE (Year: 2016).*
(Continued)

*Primary Examiner* — Bruce I Ebersman
(74) *Attorney, Agent, or Firm* — POLSINELLI

(57) ABSTRACT

A trust platform receives transaction review values from a plurality of marketplace providers, each transaction review value associated with a person-to-person transaction. The platform weighs each transaction review value to generate a weighted transaction review value based on a characteristic of the transaction. A baseline individual trust score is generated based on an aggregation of the weighted transaction review values which reflects a "trust" attributable to a user. The trust platform is also configured to adjust new transaction review values based on the baseline individual trust score to render such review more accurate.

14 Claims, 4 Drawing Sheets

Related U.S. Application Data

(60) Provisional application No. 62/905,729, filed on Sep. 25, 2019.

(51) Int. Cl.
    *G06Q 20/02*    (2012.01)
    *G06Q 40/03*    (2023.01)
    *G06Q 20/40*    (2012.01)

(52) U.S. Cl.
    CPC ..... *G06F 2221/034* (2013.01); *G06Q 20/405* (2013.01)

(56) References Cited

U.S. PATENT DOCUMENTS

| | | | |
|---|---|---|---|
| 9,319,419 B2* | 4/2016 | Sprague | H04L 63/107 |
| 9,363,283 B1* | 6/2016 | Herrera-Yagë | G06F 21/57 |
| 9,438,619 B1* | 9/2016 | Chan | G06Q 40/03 |
| 9,584,540 B1* | 2/2017 | Chan | G06Q 50/01 |
| 9,679,254 B1* | 6/2017 | Mawji | G06F 16/24578 |
| 9,721,296 B1* | 8/2017 | Chrapko | G06Q 40/03 |
| 11,055,773 B2* | 7/2021 | Dziuk | G06Q 30/0619 |
| 2011/0137789 A1* | 6/2011 | Kortina | G06Q 20/384 |
| | | | 705/38 |
| 2011/0276409 A1* | 11/2011 | Labidi | G06Q 30/02 |
| | | | 705/347 |
| 2012/0089617 A1 | 4/2012 | Frey | |
| 2012/0158585 A1* | 6/2012 | Ganti | G06Q 20/40 |
| | | | 705/44 |
| 2012/0209970 A1 | 8/2012 | Scipioni | |
| 2012/0254243 A1* | 10/2012 | Zeppenfeld | G06Q 20/4016 |
| | | | 707/778 |
| 2014/0222545 A1* | 8/2014 | Hajji | G06Q 20/20 |
| | | | 705/16 |
| 2015/0026061 A1* | 1/2015 | Siegel | G06Q 20/4016 |
| | | | 705/44 |
| 2015/0142595 A1* | 5/2015 | Acuna-Rohter | G06Q 20/40 |
| | | | 705/21 |
| 2015/0163217 A1* | 6/2015 | Lo | H04L 51/212 |
| | | | 707/748 |
| 2015/0363840 A1* | 12/2015 | Gupta | G06Q 30/0282 |
| | | | 705/347 |
| 2016/0019614 A1* | 1/2016 | Dziuk | G06Q 30/0609 |
| | | | 705/38 |
| 2017/0235792 A1* | 8/2017 | Mawji | G06F 16/29 |
| | | | 707/769 |
| 2017/0293873 A1* | 10/2017 | Chrapko | G06Q 40/03 |
| 2019/0026667 A1* | 1/2019 | Chrapko | G06Q 40/08 |
| 2019/0378219 A1* | 12/2019 | Chrapko | G06F 7/026 |
| 2020/0184480 A1 | 6/2020 | Wang | |
| 2020/0279183 A1* | 9/2020 | Chrapko | G06N 7/01 |
| 2022/0261409 A1* | 8/2022 | Trudel | G06F 16/24578 |

OTHER PUBLICATIONS

Trustworthiness evaluation system in E-Commerce context (Year: 2016).*
Feature Extraction for Fraud Detection in Electronic Marketplaces (Year: 2009).*
Maintaining Review Credibility Using NLP, Reputation, and Blockchain, IEEE (Year: 2022).*
Managing Reputation Scores in a Blockchain-based Decentralized Marketplace, IEEE (Year: 2022).*
Constantinov et al., "MoveiRate: Considerations on Applying a Custom Social Reputation Engine for Movie Reviews," 2017 IEEE, pp. 183-188.
Kuo et al., "A Trust Evaluation to Help On--Line Consumer to Choose the Provider in Auction Web Site," 2007 IEEE, pp. 1-6.

* cited by examiner

TRUST PLATFORM

CROSS-REFERENCE TO RELATED APPLICATION

The present application claims priority benefit of U.S. patent application Ser. No. 17/030,027, filed Sep. 23, 2020, entitled "TRUST PLATFORM", which claims priority benefit of U.S. provisional patent application No. 62/905,729, filed Sep. 25, 2019, entitled "DIGITAL TRUST INDEX," the disclosures of which are incorporated herein by reference.

TECHNICAL FIELD

This disclosure relates generally to data processing systems, more particularly, to generation and adjustment of individual trust scores based on statistical processing and adjustment of transaction review data associated with person-to-person transactions and the associated feedback.

BACKGROUND

Internet marketplaces and platforms that rely on user collaboration typically implement a review system to solicit feedback associated with transactions or interactions occurring within such marketplaces or platforms. In the sharing economy—where marketplaces facilitate person-to-person transactions to provide lodging, transportation, the delivery of goods, housework, or other goods and services—trust is paramount to a pleasant and successful experience for both providers and consumers of such platforms. In these marketplaces, trust may be conveyed about users and providers through ratings or reviews from other marketplace participants about previous transactions. Such reviews, however, are limited to specific marketplaces, are not portable, and do not translate to other marketplaces having varied scales (e.g., five star system, thumbs up or down), or inapplicable parameters (e.g., ride experience, advertising accuracy, smoke free room, cleanliness, etc.).

SUMMARY

According to various aspects of the subject technology, a method for generating and providing a baseline individual trust score to facilitate completion of a person-to-person transaction via a trust platform is provided. The method includes receiving transaction review values associated with a user from a plurality of marketplace and platform providers, each transaction review value is associated with a person-to-person transaction involving the user. The method further includes weighing each transaction review value to generate a weighted transaction review value based on, for example, an amount of the person-to-person transaction, a location of the person-to-person transaction, date of the person-to-person transaction, and role of the user in the person-to-person transaction. The method also includes generating a baseline individual trust score of the user based on an aggregation of the weighted transaction review values; receiving a request for the baseline individual trust score of the user in connection with a new person-to-person transaction between the user and at least one other user; and providing the baseline individual trust score to the at least one other user to facilitate completion of the new person-to-person transaction.

Another aspect of the present disclosure relates to a device for generating and providing a baseline individual trust score to facilitate completion of a person-to-person transaction. The device includes one or more network interfaces to communicate in a network; a processor coupled to the network interfaces and adapted to execute one or more processes; and a memory configured to store a process executable by the processor. The process, when executed by the processor is operable to receive transaction review values associated with a user from a plurality of marketplace providers, each transaction review value is associated with a person-to-person transaction involving the user. The processor is further operable to weigh each transaction review value to generate a weighted transaction review value based on, for example, an amount of the person-to-person transaction, a location of the person-to-person transaction, date of the person-to-person transaction, and role of the user in the person-to-person transaction. The processor is further operable to generate a baseline individual trust score of the user based on an aggregation of the weighted transaction review value; receive a request for the baseline individual trust score of the user in connection with a new person-to-person transaction between the user and at least one other user; and provide the baseline individual trust score to at least one other user to facilitate completion of a new person-to-person transaction.

Yet another aspect of the present disclosure relates to a tangible, non-transitory, computer-readable media having instructions encoded thereon, the instructions, when executed by a processor, is operable to generate and provide a baseline individual trust score to facilitate completion of a person-to-person transaction. The instructions, when executed by a processor, are operable to receive transaction review values associated with a user from a plurality of marketplace providers, each transaction review value is associated with a person-to-person transaction involving the user. The instructions, when executed by a processor, are further operable to weigh each transaction review value to generate a weighted transaction review value based on, for example, an amount of the person-to-person transaction, a location of the person-to-person transaction, date of the person-to-person transaction, and role of the user in the person-to-person transaction. The instructions, when executed by a processor, are also operable to generate a baseline individual trust score of the user based on an aggregation of the weighted transaction review value; receive a request for the baseline individual trust score of the user in connection with a new person-to-person transaction between the user and at least one other user; and provide the baseline individual trust score to the at least one other user to facilitate completion of the new person-to-person transaction.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
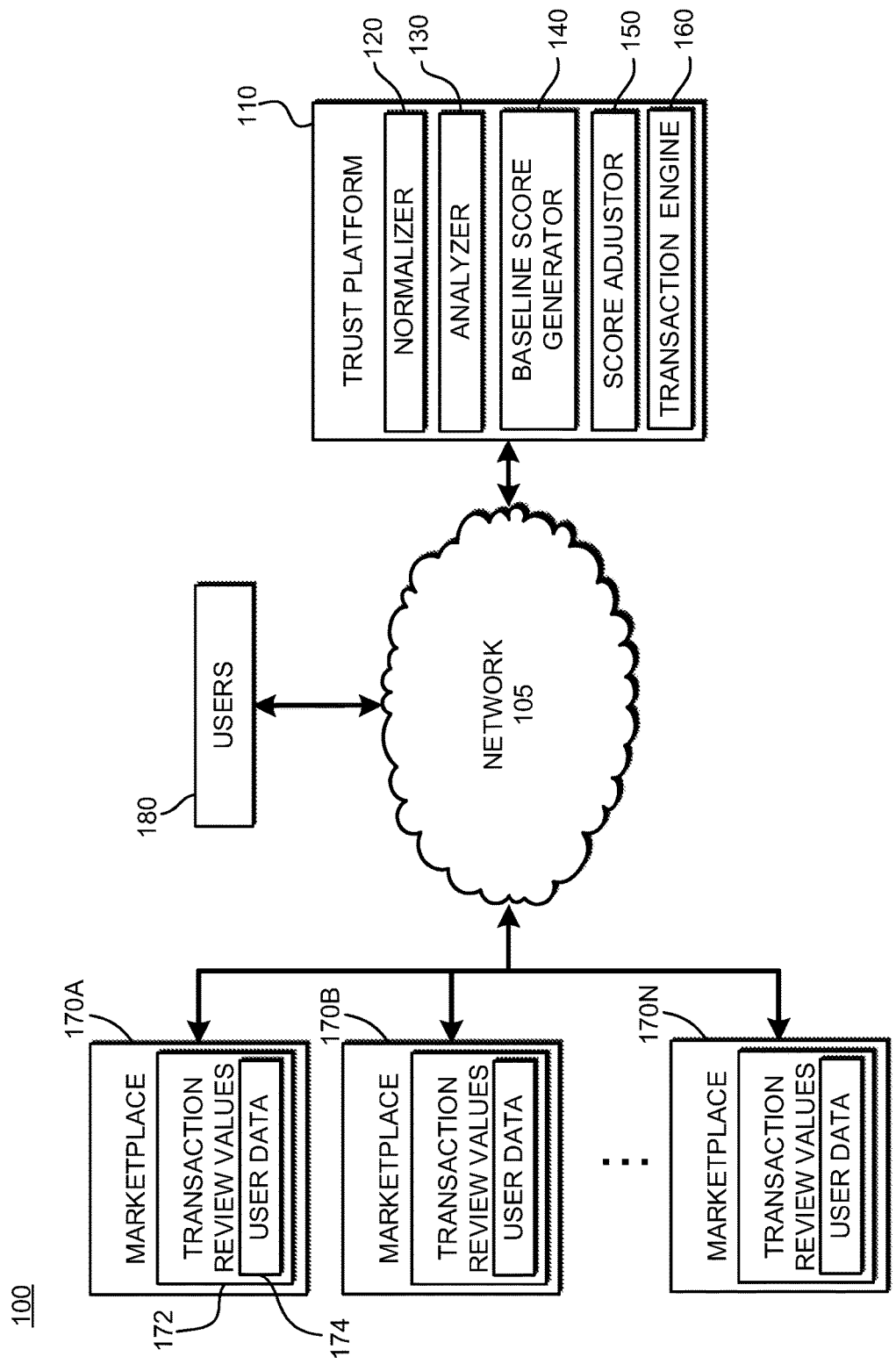
FIG. 1 illustrates a conceptual block diagram illustrating an example network environment utilizing a trust platform, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Internet marketplaces, and particularly, sharing economy marketplaces that facilitate person-to-person transactions, rely on user provided reviews associated with such transactions to instill a sense of confidence or trust to other users contemplating use of such marketplaces. The user-provided reviews may relate to the conduct of the transacting parties, the product or service being purchased or consumed, and/or attributes of the transaction (e.g., shipping speed, communication, accuracy of product description, cleanliness, safety, etc.). Conventionally, such reviews are limited to their corresponding marketplaces and are not available on other marketplaces. In other words, because marketplace providers restrict access to review data, the data collected within a particular marketplace may be incomplete and devoid of valuable information. For example, if a host on a home sharing marketplace leases out a room or apartment on that platform, the host is only able to review ratings data associated with prospective renters that are maintained on the home sharing marketplace. The host is unable to assess prospective renters based on review data maintained on other platforms, such as a ride sharing marketplace which may provide valuable review data indicating that a prospective renter is untrustworthy because they defaced the interior of a car on a prior ride. In addition, users of such marketplaces are unable to leverage their reviews from one marketplace in another marketplace. Accordingly, there is a need for a platform that is configured to intelligently aggregate reviews from across a variety of marketplaces to generate a trust score that more accurately reflects a user's "trust" rating and allows users to leverage their generated trust score on other marketplaces regardless of where the prior review data is maintained.

The disclosed technology addresses the foregoing limitations of conventional systems by aggregating and weighting review values from a plurality of person-to-person marketplaces to generate a baseline individual trust score. The generated trust score is more accurate over ratings collected by any one marketplace because the trust score is generated based on aggregating, normalizing and weighting of review values from across numerous marketplaces. In addition, by using the baseline individual trust score to determine whether new transaction review values are a statistical outlier warranting adjustment, accuracy of new transaction reviews is also improved. Accurate reviews improve user experience in marketplaces thereby resulting in higher satisfaction rates for users of such marketplaces. In addition, by utilizing a trust platform to generate the baseline individual trust score, user review data is no longer limited to a particular marketplace, thereby improving portability and better facilitating new person-to-person transactions. In other words, the generated trust score is not owned by any particular marketplace, thereby enabling users to freely leverage their established reputations. The trust platform is further configured to share the baseline individual trust score with users and marketplaces, thereby providing more meaningful reputation information to such users and marketplaces. The trust platform may also enable the provision of other financial services (e.g., insuring a transaction, providing escrow services, etc.) because the trust platform is able to more accurately determine whether a particular transaction may be successful or prone to setbacks.

FIG. 1 illustrates a conceptual block diagram illustrating an example network environment 100 utilizing a trust platform 110, in accordance with various aspects of the subject technology. The trust platform 110 is connected to a plurality of person-to-person marketplaces 170A-N (e.g., ride sharing platforms, short-term rental platforms, secondary market platforms, etc.) via a network 105. Users 180 may access the trust platform 110 directly via the network 105, or via any one of the plurality of marketplaces 170A-N. The trust platform 110 includes one or more machine-readable instructions, which may include one or more of a normalizer 120, an analyzer 130, a baseline score generator 140, a score adjustor 150, a transaction engine 160, and/or other instruction modules. In one aspect, the trust platform 110 may comprise one or more servers connected via the network 105. In some example aspects, the trust platform 110 can be a single computing device or in other embodiments, the trust platform 110 can represent more than one computing device working together (e.g., in a cloud computing configuration).

The network 105 can include, for example, one or more cellular networks, a satellite network, a personal area network (PAN), a local area network (LAN), a wide area network (WAN), a broadband network (BBN), and/or a network of networks, such as the Internet, etc. Further, the network 105 can include, but is not limited to, any one or more of the following network topologies, including a bus network, a star network, a ring network, a mesh network, a star-bus network, tree or hierarchical network, and the like.

The trust platform 110 includes at least one processor, a memory, and communications capability for receiving transaction review values 172 from the plurality of person-to-person marketplaces 170A-N. Each transaction review value 172 is associated with a person-to-person transaction involving a user. Specifically, the trust platform 110 is configured to receive transaction review values 172 associated with a particular user from one or more person-to-person marketplace 170A-N providers. For example, the trust platform 110 may utilize APIs to collect the transaction review values 172. Ongoing collections may be conducted periodically or in real-time, as desired.

In one aspect, the transaction review values 172 associated with a particular user may be identified based on user data 174 (e.g., username, user identifier, email, social media accounts, etc.) maintained by the corresponding person-to-person marketplace 170A-N. The transaction review values 172 may be encrypted or otherwise protected from exposure to protect sensitive information, such as names, addresses, and personal identifying information. In one aspect, the transaction review values 172 provided by the marketplace 170A-N providers are not shared with other marketplaces 170A-N to further protect sensitive information and maintain, if applicable, the confidential nature of such information. The transaction review values 172 may include information relating to a review or rating of a prior transaction (e.g., review text, rating values, author of review, etc.), and may include details of such transactions, including for example, dates, times, amounts, location, product sold, service used, property leased, rented or purchased, role of user in the transaction (e.g., seller or buyer).

The trust platform 110 includes the normalizer 120. The normalizer 120 is configured to normalize transaction review values 172 received from the plurality of person-to-person marketplaces 170A-N. Specifically, where transaction review values 172 of a first marketplace 170A is based on a scale (e.g., thumb up or down scale, five star rating scale, etc.) that differs from a scale of transaction review values 172 of a second marketplace 170B, the normalizer 120 adjusts the transaction review values 172 based on the differing scales so that the transaction review values 172 provided by the first and second marketplaces 170A-B are based on the same scale. For example, for transaction review values 172 from the first marketplace 170A that are based on a thumbs up or down scale where a "thumbs up" reflects a positive experience and a "thumbs down" reflects a negative experience, the transaction review values 172 from the first marketplace 170A may be adjusted to a five-star rating scale so that the transaction review values 172 from the first marketplace 170A is normalized with transaction review values 172 from the second marketplace 170B. In this example, a "thumbs up" is adjusted to a "five star" rating and a "thumbs down" is adjusted to a "one star" rating. Other normalization techniques may be utilized, as understood by a person of ordinary skill in the art, to normalize transaction review values 172 from across the plurality of marketplaces 170A-N so that the transaction review values 172 from the plurality of marketplaces 170A-N are based on the same scale.

The trust platform 110 also includes the analyzer 130. The analyzer 130 is configured to apply a weight to certain transaction review values 172 based on a characteristic of the underlying person-to-person transaction to generate weighted transaction review value, in other words the system is context-aware. The analyzer 130 may weigh transaction review values 172 based on, for example, an amount of a person-to-person transaction, a location of a person-to-person transaction, date of a person-to-person transaction, time of day for a person-to-person transaction, product or service acquired through a person-to-person transaction, whether the two or more users have transacted before, an amount of a person-to-person transaction relative to an average or median transaction within the same marketplace, an amount of a person-to-person transaction relative to an average or median transaction of the participating users, a chronological proximity of a person-to-person transaction to other transactions by the participating users, or role of a user in a person-to-person transaction. In one aspect, by applying a weight to certain transaction review values 172 based on a characteristic of the underlying person-to-person transaction, an accuracy of the generated baseline individual trust score is increased or improved.

For example, where an amount of a first person-to-person transaction is low (e.g., $1.00) compared to an amount of a second person-to-person transaction (e.g., $1,000), the analyzer 130 may be configured to apply, on the transaction review value 172 associated with the first person-to-person transaction, a higher weight than a weight applied to the transaction review value 172 associated with the second person-to-person transaction because a user's conduct in transacting in low dollar amounts may be more indicative of the user's propensity to act responsibly and honor purchasing commitments for future transactions.

As another example, where a location of a first transaction is within a geographical region of a user's home (e.g., within one mile of user's home, in same municipality as user's home, etc.) and a second transaction is located away from the geographical home region (e.g., different municipality, county or state), the analyzer 130 may be configured to apply, on the transaction review value 172 associated with the first transaction, a lower weight than a weight applied to the transaction review value 172 associated with the second transaction because a user's conduct away from their geographical home region may be more indicative of the user's propensity to act responsibly and honor purchasing commitments. For instance, because the user may be less likely to be held accountable by their neighbors or local citizens in the event of poor conduct associated with a transaction occurring away from their geographical home region, person-to-person transactions occurring away from the geographical home region may be more insightful and valuable in assessing the user's propensity to act responsibly and honor purchasing commitments for future transactions.

As yet another example, where a date of a first person-to-person transaction is more recent in time compared to a date of a second person-to-person transaction, the analyzer 130 may be configured to apply, on the transaction review value 172 associated with the first person-to-person transaction, a higher weight than a weight applied to the transaction review value 172 associated with the second person-to-person transaction because more recent transaction review value 172 may be a better indicator of the user's propensity to act responsibly and honor purchasing commitments for future transactions.

As another example, the analyzer 130 may be configured to apply a weight on transaction review values 172 based on a role of the user (e.g., buyer, seller, driver, rider, lodging provider, renter, etc.). For instance, if the user is a purchaser in a first person-to-person transaction and a seller in a second person-to-person transaction, the analyzer 130 may be configured to apply a higher weight to transaction review value 172 associated with the second person-to-person transaction because a seller in a transaction must often fulfill more tasks than a purchaser. A seller of a product, for example, must communicate effectively, field questions, quickly ship product, and ensure adequate packaging of shipped products. These additional tasks undertaken by a seller in a transaction, may provide a better indication of the user's propensity to act responsibly and honor purchasing commitments for future transactions.

The trust platform 110 includes the baseline score generator 140. The baseline score generator 140 is configured to generate a baseline individual trust score of a user based on an aggregation of the weighted transaction review values generated by the analyzer 130. The score generator 140 may perform statistical functions on the aggregated weighted transaction review values to generate the baseline individual trust score. For example, the score generator 140 may aggregate the weighted transaction review values over a given time period and calculate a mean, median, mode, and/or range. The score generator 140 may also perform predictive analytics, artificial intelligence (AI) or machine learning algorithms to the weighted transaction review values to generate the baseline individual trust score. In one aspect, the baseline individual trust score may be a single, representative number. In another aspect, the trust platform 110 is configured to track the source of the transaction review values 172 provided by the plurality of marketplaces 170A-N and its lineage thereafter, so that all data underlying a baseline individual trust score may be identified and traced back to its corresponding source. In some aspects, the generated baseline individual trust score may be validated by pulling and analyzing data from other sources, such as credit history, criminal records, and other background data sources.

In one aspect, the baseline individual trust score may be provided to any one of the person-to-person marketplaces 170A-N in order to facilitate completion of a new person-to-person transaction. For example, a request may be received from the first person-to-person marketplace 170A for the baseline individual trust score associated with a particular user who is involved in a new person-to-person transaction that is to be completed in the first person-to-person marketplace 170A. Alternatively, any user 180 involved in the new person-to-person transaction may directly request, from the trust platform 110, their own baseline individual trust score or the baseline individual trust score of any other user involved in the person-to-person transaction.

In other aspects, because the baseline individual trust score is not limited to a single marketplace 170A-N, the baseline individual trust score is portable and may be used in any of marketplaces 170A-N. Such portability allows users 180 to exit or join marketplaces 170A-N without losing their review or reputation history. A user could choose to forego participation in a marketplace 170A-N for a period of time and later resume without losing the underlying data relevant to generation of a "trust" score.

In response to the request for the baseline individual trust score, the trust platform 110 may, via the communications capability discussed above, transmit or otherwise provide the baseline individual trust score to the requesting marketplace 170A-N or requesting users 180 to facilitate completion of the new person-to-person transaction.

In one aspect, the trust platform 110 may provide the requested baseline individual trust score to marketplaces 170A-N regardless of whether a particular marketplace 170A-N contains past transaction review values 172 that were used to generate the baseline individual trust score, or user data 174 associated with users 180 involved in the new person-to-person transaction. In other words, marketplaces 170A-N that may lack relevant transaction review values 172 or user data 174 for a particular user, may nonetheless receive the requested baseline individual trust score for users associated with the new person-to-person transaction. As such, marketplaces 170A-N and users 180 of such marketplaces 170A-N may benefit where, for example, a newly registered user lacks transaction review data or feedback in such marketplaces 170A-N. Specifically, because the baseline individual trust score provides an indication to other users of a level of "trust" attributable to a new user, others involved in the new person-to-person transaction are afforded with a measure of comfort in moving forward with the transaction.

The trust platform 110 includes the transaction engine 160. The transaction engine 160 is configured to facilitate completion of the new person-to-person transaction, by for example, sending a link (e.g., URL) to the users involved in the person-to-person transaction. The link generated may be a secure URL that enables other users to view the baseline individual trust score of a particular user. Providing a link to access a particular user's baseline individual trust score is particularly useful where a marketplace may lack a review system, such as certain marketplaces for used goods that rely on anonymity of users. In this example, the baseline individual trust score may provide users with a measure of "trust" regarding the transacting parties and increase confidence in using such a platform.

The transaction engine 160 may also be configured to provide a financial product to further facilitate completion of the new person-to-person transaction. For example, the transaction engine 160 may offer insurance to insure the new person-to-person transaction based on the baseline individual trust score of one or more users associated with the transaction. In another example, the transaction engine 160 may offer insurance to insure the new person-to-person transaction based, in part, on prior review data associated with a characteristic of the transaction, such as the product or service that is the subject of the person-to-person transaction. In this example, the analyzer 130 may analyze transaction review values 172 to identify the product or service that is the subject of the prior transactions, and assess whether such product or service is likely to result in a positive experience for the transacting parties, or a negative experience. For instance, should a person-to-person transaction involve a product that, based on the transaction review values 172, may be determined to be prone to defects and returns, the transaction engine 160 may withhold an offer for insurance as the transaction is likely to result in a dissatisfied purchaser or a return. If, however, a person-to-person transaction involves a product and/or user that, based on the transaction review values 172, may be determined to result in high reviews relating to the product, the transaction engine 160 may offer insurance for the transaction as the transaction is likely to result in a positive experience for the transacting parties.

The trust platform 110 also includes the score adjustor 150. After completion of person-to-person transactions, the score adjustor 150 may be configured to analyze transaction review values associated with completed person-to-person transactions to determine whether any of the new transaction review values warrant adjustment to increase the accuracy of reviews or feedback associated with the completed person-to-person transactions. Specifically, new transaction review values associated with new person-to-person transactions are received by the trust platform 110.

In one aspect, the score adjustor 150 is configured to analyze the new transaction review values to determine whether a particular new transaction review value is a statistical outlier from the baseline individual trust score of a user partaking in the new person-to-person transaction. If a new transaction review value is a statistical outlier from the baseline individual trust score of the user, then the score adjustor 150 conducts further analysis of the new transaction review value to identify a potential cause or context for the outlier. By understanding the context for the outlier, adjustment of the new transaction review value may be warranted to ensure that review data is maintained in an accurate manner. The new transaction review value may therefore be adjusted based on the identified context of the new person-to-person transaction, to generate an adjusted transaction review value.

The score adjustor 150 may review transaction details of the underlying person-to-person transaction to identify a context of the new person-to-person transaction. Transaction details may provide information relating to an amount of the transaction, location of the transaction, date and time of the transaction, type and identity of the product or service sold or consumed, number of parties involved in the transaction, role of the user in the transaction, distribution of transaction review values authored or received by the user, whether the two or more users have transacted before, the amount of the transaction relative to an average or median transaction within the same marketplace, the amount of the transaction relative to an average or median transaction of the participating users, a chronological proximity of the transaction to other transactions by the participating users, and other attributes of the transaction as could be ascertained from the transacting details captured by the relevant person-to-person marketplace 170A-N.

For example, should a rider having a high baseline individual trust score receive a low rating from a driver on a ride sharing marketplace, the score adjustor 150 may identify a context for the recent ride. The score adjustor 150 may analyze the underlying transaction details associated with the person-to-person transaction to determine whether the ride occurred in a home geographical region of the rider, the time of the transaction, and whether the rider was alone in the vehicle or shared the ride with other passengers. If the score adjustor 150 determines that the ride occurred in the early hours of a Saturday night and included other passengers—one of whom has a low baseline individual trust score—then the score adjustor 150 may determine that the low rating given to the rider may not have been warranted, as the low rating may properly be attributed to the passenger having the low baseline individual trust score. In this example, the score adjustor 150 may determine, based on the context of the underlying person-to-person transaction, that the low rating should be adjusted so that the new transaction review value does not unfairly negatively impact the rider's baseline individual trust score. In addition, adjustment of the low rating to a higher rating, will more accurately reflect feedback associated with the rider in the ride sharing marketplace.

The adjusted new transaction review value may be provided to the corresponding marketplace 170A-N associated with the new person-to-person transaction. As discussed above, the adjusted transaction review value may be used by the corresponding marketplace 170A-N associated with the new person-to-person transaction to modify the initial review associated with the new person-to-person transaction so that the modified review more accurately reflects the outcome of the new person-to-person transaction.

In another aspect, the score adjustor 150 is configured to analyze new transaction review values generated by a particular user to determine whether the new transaction review value is a statistical outlier from prior transaction review values 172 provided by that same user. If a new transaction review value is a statistical outlier from prior transaction review values 172, then the score adjustor 150 conducts further analysis of the new transaction review value to identify a potential cause or context for the outlier. By understanding the context for the outlier, adjustment of the new transaction review value may be warranted to ensure that review data is maintained in an accurate manner. The new transaction review value may therefore be adjusted based on the identified context of the new person-to-person transaction, to generate an adjusted transaction review value.

For example, should a user who on average, provides ratings in the range of 4 out of a scale of 5, submits a rating of 1 out of 5 for a new person-to-person transaction, the score adjustor 150 may conduct further analysis of the new transaction review value to identify a potential cause or context for the outlier. The cause for the low review may provide valuable insight as to other persons involved in the transaction, the products or services associated with the transaction, or particular characteristics of the transaction that contribute or are attributed to the low score.

As another example, should a user who on average, provides low ratings in the range of 3 out of a scale of 5, submits a rating of 3 for a new person-to-person transaction, the score adjustor 150 may conduct further analysis to identify a scoring propensity of the user. The new transaction review value may be adjusted if analysis of the context reveals that the poor review is not warranted because the user has a propensity to review harshly. The score adjustor 150 is thus configured to evaluate a user's propensity to review harshly or generously, and adjust such reviews accordingly. Adjustment of the new transaction review value may therefore achieve a more accurate representation of the transaction.

In another aspect, the score adjustor 150 may be configured to analyze the baseline individual trust score of users 180 to determine whether the baseline individual trust score of a particular user is a statistical outlier from the baseline individual trust score of other users of a particular marketplace 170A-N. If the baseline individual trust score of a particular user is a statistical outlier from the baseline individual trust score of other users of a particular marketplace 170A-N, then the score adjustor 150 may adjust new transaction review values provided by that particular user to increase the accuracy of any reviews or ratings provided by that particular user. By adjusting new transaction review values provided by users having outlier baseline individual trust scores, reviews generated by such users who may be overly-harsh or overly-generous, may be adjusted so that their reviews are more accurate.

For example, should a user with a low outlier baseline individual trust score provide reviews that are usually below a certain value (e.g. 3 out of a scale of 5), then the score adjustor 150 may adjust the review so that the review does not negatively affect other transacting users, products, or services. In other words, the score adjustor 150 is configured to adjust new transaction review values so that they account for a scoring propensity of a particular user. If a user has a propensity to review harshly, then the score adjustor 150 may adjust review values provided by the user to reflect the user's scoring propensity. A rating of 3 stars out of 5 stars from the user, may be equivalent to a rating of 5 stars from other users. As such, the score adjustor 150 may generate an adjusted transaction review value when the baseline individual trust score of the user is a statistical outlier from the baseline individual trust score of the plurality of users of the marketplace 170A-N. Adjustment of the low rating to a higher rating, will therefore more accurately reflect feedback associated with the transaction.

The adjusted new transaction review value may be provided to the corresponding marketplace 170A-N associated with the new person-to-person transaction. As discussed above, the adjusted transaction review value may be used by the corresponding marketplace 170A-N associated with the new person-to-person transaction to modify the initial review associated with the new person-to-person transaction so that the modified review more accurately reflects the outcome of the new person-to-person transaction.

Figure 2:
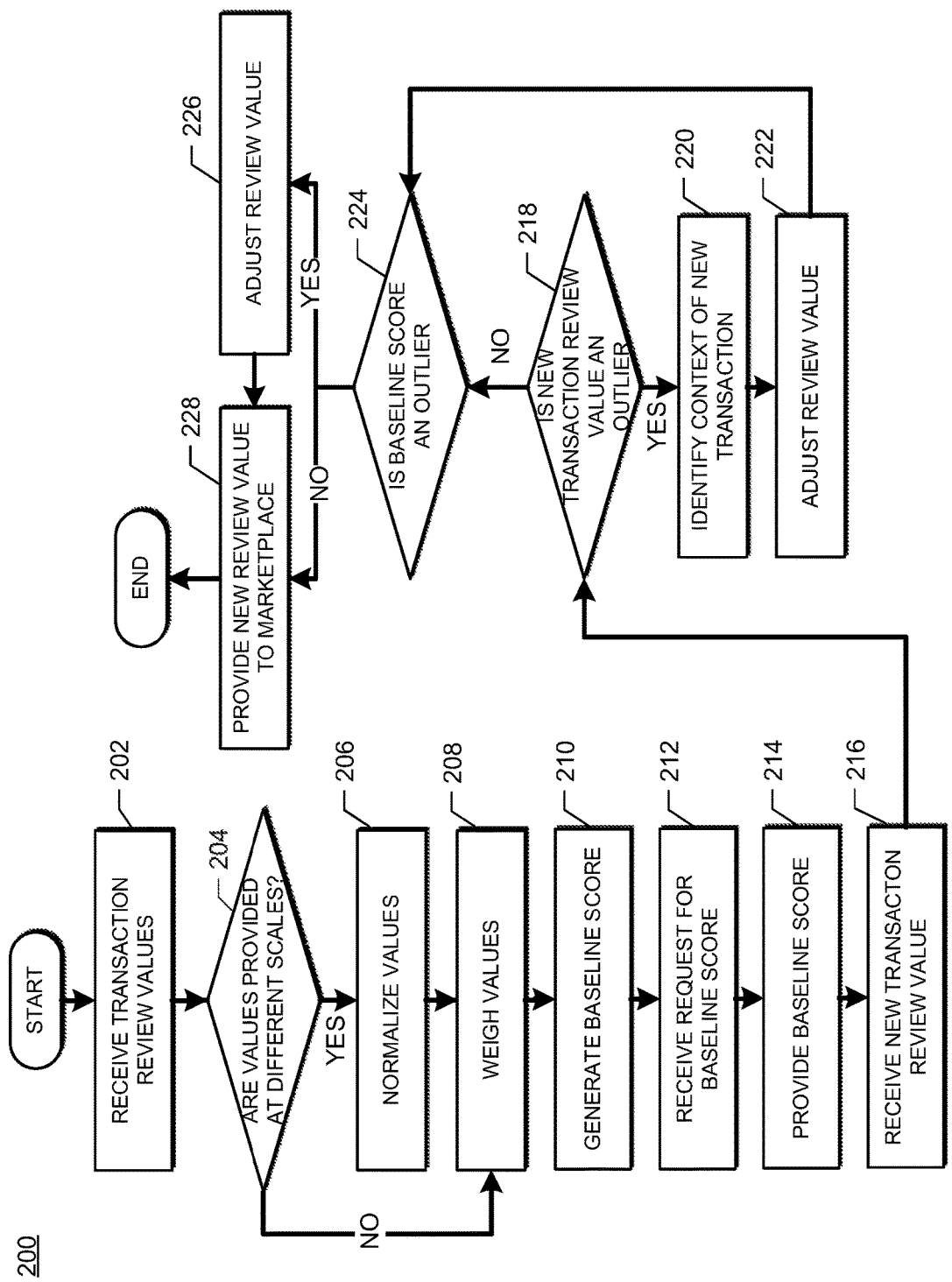
FIG. 2 illustrates an example process diagram for generating a baseline individual trust score and adjusting a transaction review value, in accordance with various aspects of the subject technology.

FIG. 2 illustrates an example process 200 for generating a baseline individual trust score and adjusting a transaction review value, in accordance with various aspects of the subject technology. It should be understood that, for any process discussed herein, there can be additional, fewer, or alternative steps performed in similar or alternative orders, or in parallel, within the scope of the various aspects unless otherwise stated. The process 200 can be performed by the network environment 100 utilizing a trust platform 110 or similar system.

At step 202, transaction review values associated with a user are received from a plurality of marketplace providers. Each transaction review value is associated with a person-to-person transaction involving the user. At step 204, it is determined whether the transaction review values provided by the plurality of marketplaces are provided at different scales. If the transaction review values are provided at different scales, then at step 206, the transaction review values are normalized, as discussed above. If transaction review values are not provided at different scales, then at step 208, the transaction review values are weighted to generate weighted transaction review values based on, for example, an amount of the person-to-person transaction, a location of the person-to-person transaction, date of the person-to-person transaction, time of day for the person-to-person transaction, product or service acquired through the person-to-person transaction, whether the two or more users have transacted before, an amount of the person-to-person transaction relative to an average or median transaction within the same marketplace, an amount of the person-to-person transaction relative to an average or median transaction of the participating users, a chronological proximity of the person-to-person transaction to other transactions by the participating users, and role of the user in the person-to-person transaction. At step 210, a baseline individual trust score of the user is generated based on an aggregation of the weighted transaction review values.

At step 212, a request for the baseline individual trust score of the user is received in connection with a new person-to-person transaction between the user and at least one other user. At step 214, the baseline individual trust score of the user is provided to the at least one other user to facilitate completion of the new person-to-person transaction. The baseline individual trust score of the user may be sent to a marketplace that is outside of the marketplaces that provided the transaction review values at step 202.

At step 216, new transaction review values associated with the new person-to-person transaction are received from a marketplace associated with the new person-to-person transaction. At step 218, it is determined whether the new transaction review value is a statistical outlier from the baseline individual trust score of the user. If the new transaction review value is a statistical outlier from the baseline individual trust score of the user, then at step 220, a context of the new person-to-person transaction is identified. The context of the new person-to-person transaction may include, for example, identifying a role of the user in the transaction, identifying other persons involved in the transaction, identifying a location of the transaction, identifying an amount of the transaction, time of day for the transaction, product or service acquired through the transaction, whether the two or more users have transacted before, an amount of the transaction relative to an average or median transaction within the same marketplace, an amount of the transaction relative to an average or median transaction of the participating users, a chronological proximity of the transaction to other transactions by the participating users, and identifying a distribution of transaction review values authored or received by the user. At step 222, the new transaction review value is adjusted to generate an adjusted transaction review value based on the identified context of the new person-to-person transaction.

At step 224, it is determined whether the baseline individual trust score of the user is a statistical outlier from the baseline individual trust score of a plurality of users of a marketplace associated with the new person-to-person transaction. If the baseline individual trust score of the user is a statistical outlier from the baseline individual trust score of a plurality of users, then at step 226, the new transaction review value is adjusted to generate an adjusted transaction review value. At step 228, the adjusted transaction review value is provided to the marketplace associated with the new person-to-person transaction. The adjusted transaction review value may be used to modify a review associated with the new person-to-person transaction to improve the accuracy of the review associated with the new person-to-person transaction.

Figure 3:
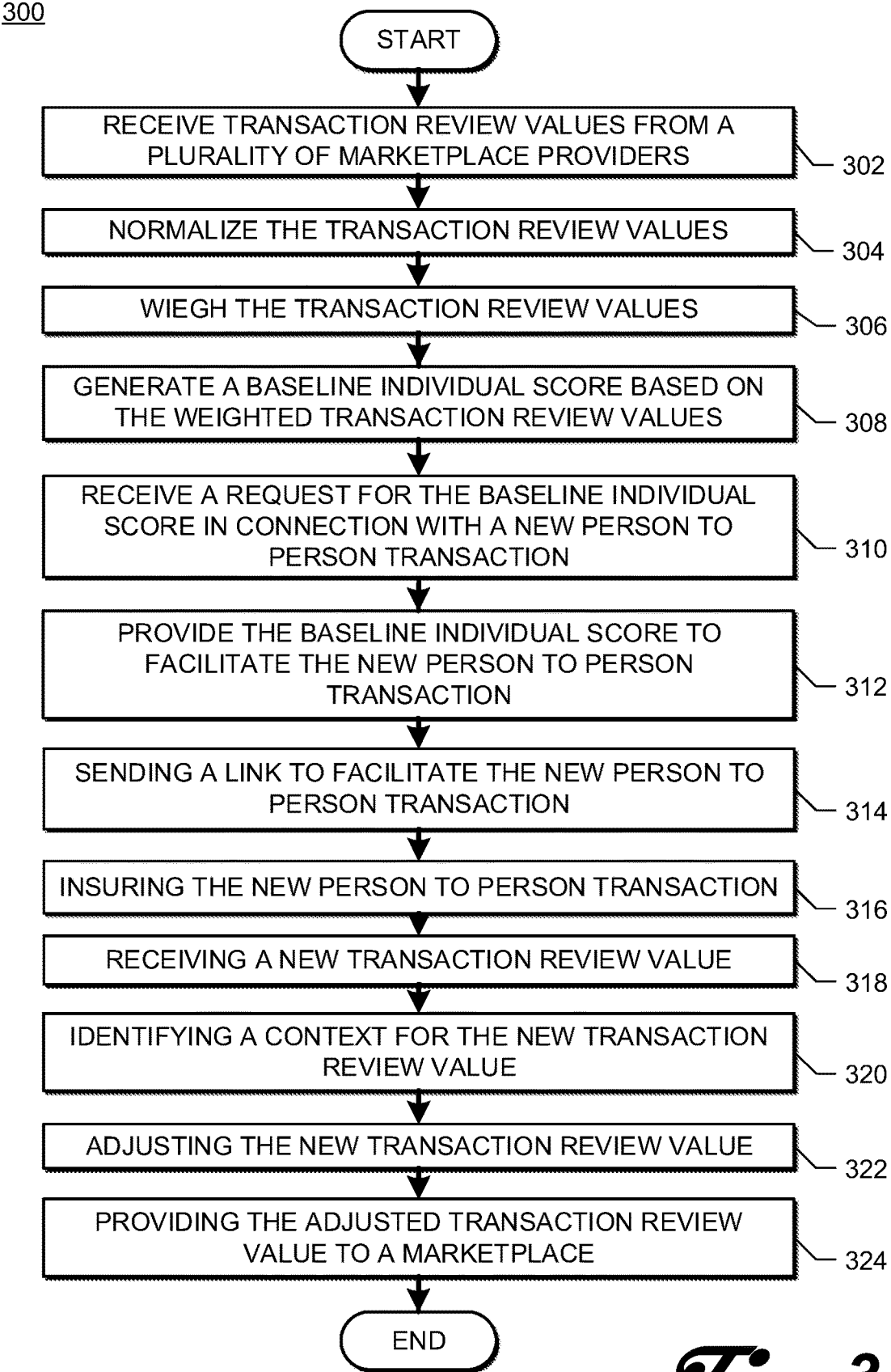
FIG. 3 illustrates an example method for generating a baseline individual trust score and adjusting a transaction review value, in accordance with various aspects of the subject technology.

FIG. 3 illustrates an example method 300 for generating a baseline individual trust score and adjusting a transaction review value, in accordance with various aspects of the subject technology. At operation 302, transaction review values associated with a user are received from a plurality of marketplaces. Each transaction review value is associated with a person-to-person transaction involving the user. At operation 304, transaction review values are normalized if the transaction review values provided by the plurality of marketplaces are based on differing scales.

At operation 306, each transaction review value is weighed to generate a weighted transaction review value based on, for example, an amount of the person-to-person transaction, a location of the person-to-person transaction, date of the person-to-person transaction, time of day for the person-to-person transaction, the product or service acquired through the person-to-person transaction, whether the two or more users have transacted before, an amount of the transaction relative to the average or median transaction within the same marketplace, an amount of the transaction relative to the average or median transaction of the participating users, the chronological proximity of the person-to-person transaction to other transactions by the participating users, and role of user in the person-to-person transaction. For example, a first weight may be applied to a transaction review value associated with a first person-to-person transaction based on an amount of the first person-to-person transaction, and a second weight, different from the first weight, may be applied to a transaction review value associated with a second person-to-person transaction based on an amount of the second person-to-person transaction, where the amount of the first person-to-person transaction is different from the amount of the second person-to-person transaction.

As another example, a first weight may be applied to a transaction review value associated with a first person-to-person transaction based on a location of the first person-to-person transaction, and a second weight, different from the first weight, may be applied to a transaction review value associated with a second person-to-person transaction based on a location of the second person-to-person transaction, where the location of the first person-to-person transaction is closer to a home of the user than the location of the second person-to-person transaction.

As yet another example, a first weight may be applied to a transaction review value associated with a first person-to-person transaction based on a date of the first person-to-person transaction, and a second weight, different from the first weight, may be applied to a transaction review value associated with a second person-to-person transaction based on a date of the second person-to-person transaction, where the date of the first person-to-person transaction is more recent than the date of the second person-to-person transaction.

And as another example, a first weight may be a applied to a transaction review value associated with a first person-to-person transaction based on a role of the user in the first person-to-person transaction, and a second weight, different from the first weight, may be applied to a transaction review value associated with a second person-to-person transaction based on the role of the user in the second person-to-person transaction, where the role of the user in the first person-to-person transaction is different from the role of the user in the second person-to-person transaction.

At operation 308, a baseline individual trust score of the user is generated based on an aggregation of the weighted transaction review values. At operation 310, a request for the baseline individual trust score of the user is received in connection with a new person-to-person transaction between the user and at least one other user. At operation 312, the baseline individual trust score is provided to the at least one other user to facilitate completion of the new person-to-person transaction. In one aspect, the baseline individual trust score of the user may be provided to marketplaces that lack data associated with the user or transaction review values associated with the user.

At operation 314, a link may be sent to the at least one other user to facilitate completion of the new person-to-person transaction. At operation 316, the new person-to-person transaction may be insured based on the baseline individual trust score of the user.

At operation 318, new transaction review value associated with the new person-to-person transaction is received. If the new transaction review value is a statistical outlier from the baseline individual trust score of the user, then at operation 320, a context of the new person-to-person transaction is identified. Identifying the context may include identifying a role of the user in the new person-to-person transaction, identifying other persons involved in the new person-to-person transaction, identifying a location of the new person-to-person transaction, date or time of day for the person-to-person transaction, the product or service acquired through the person-to-person transaction, whether the two or more users have transacted before, an amount of the transaction relative to the average or median transaction within the same marketplace, an amount of the transaction relative to the average or median transaction of the participating users, the chronological proximity of the person-to-person transaction to other transactions by the participating users and identifying an amount of the new person-to-person transaction. At operation 322, the new transaction review value is adjusted to generate an adjusted transaction review value based on the identified context of the new person-to-person transaction. At operation 324, the adjusted transaction review value is provided to a marketplace associated with the new person-to-person transaction. The adjusted transaction review value may be used to modify a review associated with the new person-to-person transaction to increase the accuracy of the review associated with the new person-to-person transaction.

It should be noted that certain operations within method 300 may be optional, and further, the operations shown in FIG. 3 are merely examples for illustration—certain other operations may be included or excluded as desired. Further, while a particular order of the method is shown, this ordering is merely illustrative, and any suitable arrangement of the operations may be utilized without departing from the scope of the embodiments herein. In addition, although method 300 is described with respect to a trust platform, certain operations may be executed by devices or modules running by a distributed network of devices.

Figure 4:
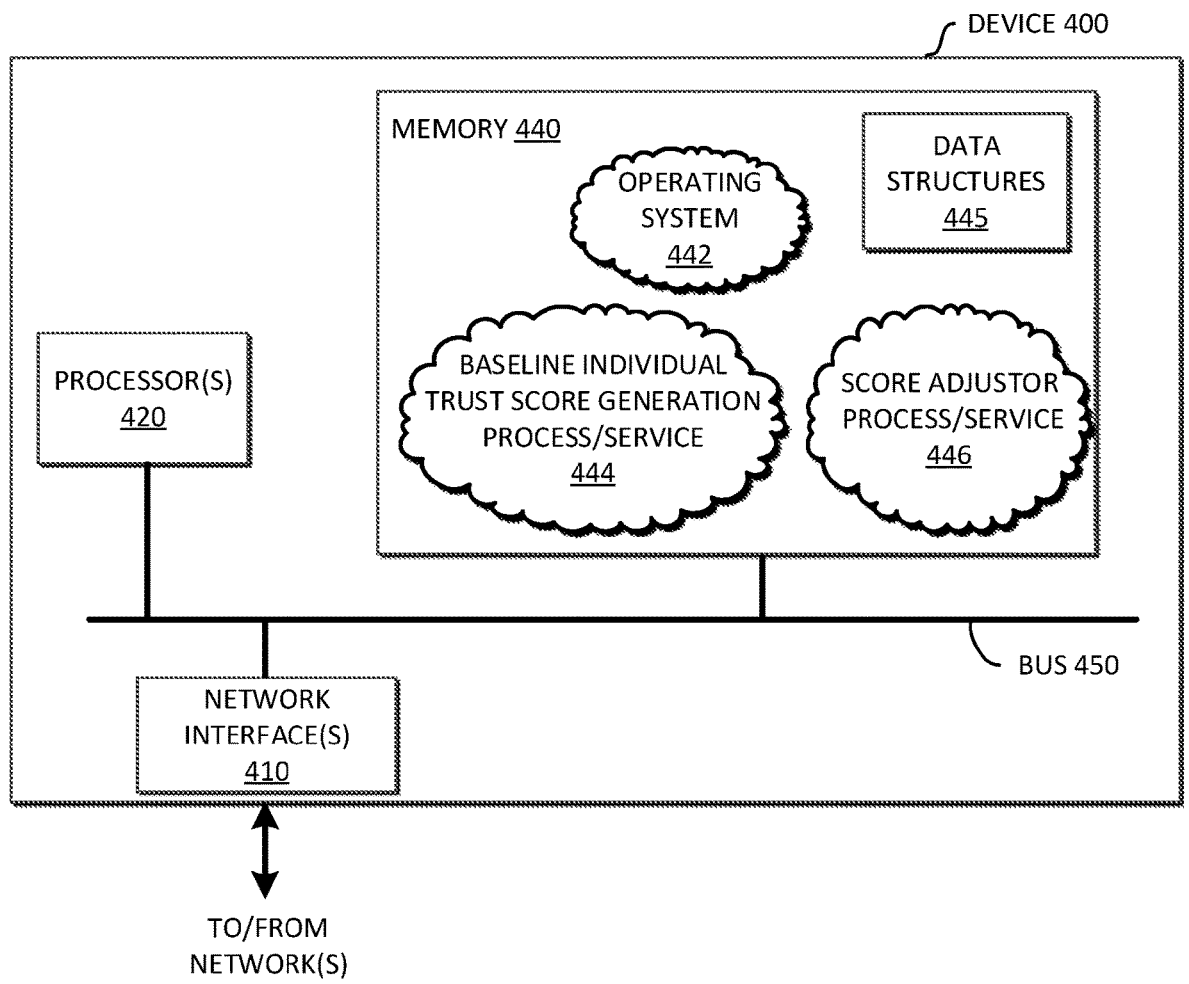
FIG. 4 illustrates a schematic block diagram of an example device for performing the techniques disclosed herein.

FIG. 4 illustrates a schematic block diagram of an example device 400 (e.g., trust platform, etc.) that may be used with one or more embodiments described herein. Device 400 may comprise one or more network interfaces 410 (e.g., wired, wireless, PLC, etc.), at least one processor 420, and a memory 440 interconnected by a system bus 450.

Device 400 may comprise one or more network interfaces 410, at least one processor 420, and a memory 440 interconnected by a system bus 450. Network interface(s) 410 contain the mechanical, electrical, and signaling circuitry for communicating data over links coupled to one or more of the networks shown in communication environment 100. Network interfaces 410 may be configured to transmit and/or receive data using a variety of different communication protocols, as will be understood by those skilled in the art.

Memory 440 comprises a plurality of storage locations that are addressable by processor 420 for storing software programs and data structures associated with the embodiments described herein. Processor 420 may comprise necessary elements or logic adapted to execute the software programs and manipulate data structures 445. An operating system 442, portions of which are typically resident in memory 440 and executed by processor 420, functionally organizes the device by, inter alia, invoking operations in support of software processes and/or services executing on the device. These software processes and/or services may comprise an illustrative "baseline individual trust score generation" process/service 444, as well as "score adjustor" process/service 446, as described herein. Note that while process/services 444 and 446 are shown in centralized memory 440, some embodiments provide for these processes/services to be operated in a distributed computing network.

Illustratively, the techniques described herein may be performed by hardware, software, and/or firmware, such as in accordance with the illustrative baseline individual trust score generation process 444 and/or the illustrative score adjustor process 446, which may contain computer executable instructions executed by processor 420 to perform functions relating to score generation and/or score adjustment described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 420 can include one or more programmable processors, e.g., microprocessors or microcontrollers, or fixed-logic processors. In the case of a programmable processor, any associated memory, e.g., memory 440, may be any type of tangible processor readable memory, e.g., random access, read-only, etc., that is encoded with or stores instructions that can implement program modules. Processor 420 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

The techniques herein provide a mechanism to generate a baseline individual trust score for users based on aggregated and weighted transaction review values provided by a plurality of person-to-person marketplace providers. The baseline individual trust score more accurately reflects a user's "trust" rating and allows users to leverage their generated trust score on other marketplaces regardless of where the prior transaction review values were maintained. The individual baseline trust score therefore removes inefficiencies and friction from person-to-person transactions, as other users are provided with a measure of assurance and security that the contemplated transaction will be successful. Further, new entrants to a marketplace are able to immediately garner trust, as the baseline individual trust score is not limited to a particular marketplace and can be utilized across all marketplaces regardless of whether a particular user is well established or new.

In addition, by using the baseline individual trust score to determine whether new transaction review values are a statistical outlier warranting adjustment, accuracy of new transaction reviews is improved. Accurate reviews improve user experience in marketplaces thereby resulting in higher satisfaction rates for users of such marketplaces. The trust platform may also enable the provision of other financial services (e.g., insuring a transaction, providing escrow services, etc.) because the trust platform is able to more accurately determine whether a particular transaction may be successful or prone to setbacks.

While there have been shown and described illustrative embodiments and processes executed by a trust platform, it is to be understood that various other adaptations and modifications may be made within the spirit and scope of the embodiments herein. For example, the embodiments have been shown and described herein with relation to one trust platform; however, the embodiments in their broader sense are not as limited, and may, in fact, be used with any number of servers, devices, systems, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A trust platform system comprising:
one or more servers to communicate over a network;
a processor coupled to the one or more servers; and
a memory configured to store instructions, the instructions, when executed by the processor, are operable to:
receive transaction review values from a marketplace over the network, the transaction review values being associated with person-to-person transactions and predetermined scoring scales;
determine a first average review value for the transaction review values from the marketplace;
identify a first set of transaction review values associated with a first user from the transaction review values from the marketplace;
determine a second average review value for the first user the first set of transaction review values;
determine a propensity score for the first user based on a comparison between the first average review value for the first user and the second average review values the propensity score indicating a tendency of the first user to rate the transactions above-average or below-average;
adjust each transaction review value of the first set of transaction review values based on the propensity score of the first user;
determine an individual trust score for the first user based on an aggregation of each adjusted transaction review value of the first set of transaction review values, the individual trust score being indicative of indicating an established reputation of the first user; and facilitate a new transaction between the first user and a second user based on the individual trust score for the first user;

receive a new transaction review value from the first user for the new transaction;

identify differences between the propensity score for the first user and the new transaction review value; generate an adjusted new transaction review value for the new transaction based on the differences; and provide the adjusted new transaction review value to the marketplace over the network.

2. The trust platform system of claim 1, wherein the instructions are further operable to:
modify the adjusted new transaction review value for the new transaction based on a context of the new transaction.

3. The trust platform system of claim 2, wherein the context includes at least one of an amount of the new transaction, a location of the new transaction, a type of product or service sold or consumed in the new transaction, or a number of parties involved in the new transaction.

4. The trust platform system of claim 1, wherein the instructions to determine the individual trust score are further operable to:
identify a first subset of the first set of transaction review values based on a first role of the first user;
identify a second subset of the first set of transaction review values based on a second role of the first user;
determine a first weight the first subset based on the first role of the first user;
determine a second weight for the second subset based on the second role of the first user, the second weight being different than the first weight;
apply the first weight to the first subset; and
apply the second weight to the second subset.

5. The trust platform system of claim 1, wherein at least one of the predetermined scoring scales is a one-to-five scale.

6. The trust platform system of claim 4, wherein the role includes at least one of a buyer, a seller, a service provider, or a service receiver.

7. A method, comprising:
receiving, by a trust platform implemented by one or more servers, transaction review values from a marketplace over a network, the transaction review values being associated with transactions and predetermined scoring scales determining, by the trust platform implemented by one or more servers, a first average review value for the transaction review values from the marketplace;

identifying, by the trust platform implemented by one or more servers, a first set of transaction review values associated with a first user from the transaction review values from the marketplace;

determining, by the trust platform implemented by one or more servers, a second average review value for a first user based on an average value of the respective normalized transaction review values associated with the first user the first set of transaction review values;

generating determining, by the trust platform implemented by one or more servers, a propensity score for the first user based on a comparison of between the baseline first average review value for the first user and the respective normalized transaction second average review values for the one or more internet marketplaces, the propensity score being indicative of indicating a tendency of the first user to rate the person-to-person transactions above-average or below-average;

determining, by the trust platform implemented by one or more servers, a weighted value for each normalized transaction review value based on a role of the first user for each person-to-person transaction;

adjusting, by the trust platform implemented by one or more servers, the weighted value for each normalized each transaction review value of the first set of transaction review values based on the propensity score of the first user;

determining, by the trust platform implemented by one or more servers, an individual trust score for the first user based on an aggregation of each adjusted weighted value transaction review value for the first set of transaction review values, the individual trust score being indicative of indicating an established reputation of the first user; and facilitating, by the trust platform implemented by one or more servers, a new person-to-person transaction between the first user and a second user based on the individual trust score for the first user;

receiving, by the trust platform implemented by one or more servers, a new transaction review value from the first user for the new transaction;

identifying, by the trust platform implemented by one or more servers, differences between the propensity score for the first user and the new transaction review value;

generating, by the trust platform implemented by one or more servers, an adjusted new transaction review value for the new transaction based on the differences; and providing, by the trust platform implemented by one or more servers, the adjusted new transaction review value to the marketplace over the network.

8. The method of claim 7, further comprising:
modifying, by the trust platform implemented by one or more servers, the adjusted new transaction review value for the new transaction based on a context of the transaction.

9. The method of claim 7, wherein the context includes at least one of an amount of the new transaction, a location of the new transaction, a type of product or service sold or consumed in the new transaction, or a number of parties involved in the new transaction.

10. The method of claim 7, wherein determining the individual trust score further comprises:
identifying, by the trust platform implemented by one or more servers, a first subset of the first set of transaction review values based on a first role of the first user;
identifying, by the trust platform implemented by one or more servers, a second subset of the first set of transaction review values based on a second role of the first user;
determining, by the trust platform implemented by one or more servers, first weight for the first subset based on the first role of the first user;
determining, by the trust platform implemented by one or more servers, a second weight for the first subset based on the second role of the first user;
applying, by the trust platform implemented by one or more servers, the first weight to the first subset;
and applying, by the trust platform implemented by one or more servers, the second weight to the second subset.

11. The method of claim 10, wherein the role includes at least one of a buyer, a seller, a service provider, or a service receiver.

12. A tangible, non-transitory, computer-readable medium having instructions encoded thereon, the instructions, when executed, are operable to:
   receive transaction review values from a marketplaces over a network, the transaction review values being associated with transactions and predetermined scoring scales
   determine a first average review value for the transaction review values from the marketplace;
   identify a first set of transaction review values associated with a first user from the transaction review values from the marketplace;
   determine a baseline second average review value for a first user based on an average value of the respective normalized transaction review values associated with the first user the first set of transaction review values;
   generate determine a propensity score for the first user based on a comparison between the baseline first average review value for the first user and the respective normalized second average transaction review values for the one or more internet marketplaces, the propensity score being indicative of indicating a tendency of the first user to rate the person-to-person transactions above-average or below-average;
   determine a weighted value for each normalized transaction review value based on a role of the first user for each person-to-person transaction;
   adjust each transaction review value of the weighted value for each normalized first set of transaction review values based on the propensity score for the first user;
   determine an individual trust score for the first user based on an aggregation of each adjusted weighted transaction review value of the first set of transaction review values, the individual trust score being indicative of indicating an established reputation of the first user; and
   facilitate a new person-to-person transaction between the first user and a second user based on the individual trust score for the first user;
   receive a new transaction review value from the first user for the new transaction;
   identify differences between the propensity score for the first user and the new transaction review value;
   generate an adjusted new transaction review value for the new transaction based on the differences; and
   provide the adjusted new transaction review value to the marketplace over the network.

13. The tangible, non-transitory, computer-readable medium of claim 12, wherein the instructions, when executed, are further operable to:
   modify the adjusted new transaction review value for the new transaction based on a context of the new.

14. The tangible, non-transitory, computer-readable medium of claim 12, wherein the instructions, when executed to determine the individual trust score, are further operable to:
   identify a first subset of the first set of transaction review values based on a first role of the first user;
   receive identify a second subset of the first set of transaction review values from the one or more internet marketplaces for the second based on a second role of the first user;
   determine a first weight propensity score for the second user first subset based on a comparison of a the first role of the first user;
   determine a second weight for the first subset based on the second role of the first user;
   apply the first weight to the first subset
   apply the second weight to the second subset.

* * * * *